United States Patent [19]

Johnston

[11] Patent Number: 4,695,071

[45] Date of Patent: Sep. 22, 1987

[54] HAND POWERED TRICYCLE HAVING A WHEELCHAIR HITCH

[76] Inventor: Fred E. Johnston, R.F.D. Box 83, Cleghorn, Iowa 51014

[21] Appl. No.: 916,691

[22] Filed: Oct. 8, 1986

[51] Int. Cl.$^4$ ............................ B62K 27/00; B60D 1/00
[52] U.S. Cl. .................................. 290/204; 280/250; 280/291; 280/402
[58] Field of Search ....... 280/202, 204, 291, 242 WC, 280/250, 282, 292, 402, 289 WC; 414/563

[56] References Cited

U.S. PATENT DOCUMENTS

| | | | |
|---|---|---|---|
| 1,105,731 | 8/1914 | Wells | 280/204 |
| 3,381,973 | 5/1968 | Carr | 280/30 |
| 3,485,510 | 12/1969 | Merlan | 280/250 |
| 3,740,074 | 6/1973 | Coil | 280/204 |
| 3,848,891 | 11/1974 | Vittori | 280/250 |
| 4,109,927 | 8/1978 | Harper | 280/250 |
| 4,152,005 | 5/1979 | Vanore | 280/234 |
| 4,316,616 | 2/1982 | Boivin | 280/289 WC |
| 4,471,972 | 9/1984 | Young | 280/289 WC |
| 4,502,705 | 3/1985 | Weaver | 280/231 |
| 4,546,993 | 10/1985 | Walker | 280/291 |

OTHER PUBLICATIONS

Brochure, Debbie Bike Company, 529 N.W. 9th Street, Chisholm, Minn. 55719.
Brochure, New England Handcycles, Inc., 228 Winchester Street, Brookline, Mass. 02146.
Brochure, Palmer Industries, P.O. Box 707, Endicott, N.Y. 13760.
Brochure, Unicycle Co. (1982) Inc., P.O. Box 276, Station "N", Montreal, Canada H2X 3M4.

*Primary Examiner*—John A. Pekar
*Attorney, Agent, or Firm*—Henderson & Sturm

[57] ABSTRACT

A hand operated cycle apparatus including a cycle frame having a pair of spaced apart rear wheels rotatably attached along the horizontal axis to the rear of the cycle frame. A yoke is pivotally attached to the front of the cycle frame and a front wheel is rotatably attached to the yoke. A drive mechanism is provided for rotating the front wheel and pedals are attached to an upper portion of the yoke and to the drive apparatus for selectively turning the drive apparatus by hand. A seat is attached to a rear portion of the cycle frame. Brakes are operably attached to the cycle frame for selectively holding both of the rear wheels from rotating with respect to the frame. A footrest is provided for supporting the feet of the cycle user. A wheelchair hitch is connected to the rear of the cycle frame and has an elongated rod extending transverse to the direction of forward movement of the cycle frame and has a pair of spaced locking members thereon so that a wheelchair having foot supports on the front thereof can be easily towed from place to place without the fear of it coming loose, while at the same time being easily attached to or detached from the hitch.

5 Claims, 12 Drawing Figures

HAND POWERED TRICYCLE HAVING A WHEELCHAIR HITCH

TECHNICAL FIELD

The present invention relates generally to a hand powered tricycle for parapalegic persons and leg amputees, and more particularly to such a tricycle having a wheelchair hitch attached thereto.

BACKGROUND ART

Various cycle devices have been devised for persons confined to a wheelchair such as parapalegics which have full use of their upper portion of their body, including their hands and arms. U.S. Pat. No. 3,485,510 to Merlan, U.S. Pat. No. 4,316,616 to Boivin and U.S. Pat. No. 4,471,972 to Young show a cycle device which is attached to a wheelchair and has pedals and a chain drive for allowing a person in the wheelchair to use his or her hands to propel a device from place to place. One of the problems with these devices in general is that they either preclude use of the wheelchair itself, such as in the Merlan device, or they are extremely difficult to hook up to a wheelchair or unhook from a wheelchair, such as in the Boivan or Young devices, so that it is very difficult to switch from one to the other.

Various other bicycle or tricycle devices such as those shown in U.S. Pat. No. 3,848,891 to Vittori, U.S. Pat. No. 4,109,927 to Harper, U.S. Pat. No. 4,152,005 to Vanore, and U.S. Pat. No. 4,502,705 to Weaver all show cycles which use hand pedals for powering the cycle from place to place. These cycles work fine for that purpose, but do not allow ready access to a wheelchair when such is necessary. If these devices were to be used by a wheelchair bound person to be driven to the place of employment, to a shopping center or a grocery store or the like, they would not be useful to go inside and move around in rooms or in stores or office buildings. Consequently, it is not practical for a wheelchair-bound person to use these cycles for the purpose of going to places like that.

Consequently, there is a need for a hand powered cycle which would be useful to allow the wheelchair-bound person to go from place to place, but still have his or her wheelchair readily available for use in homes, offices, shopping centers or stores without having a tedious and awkward task of trying to disassemble the chair from the hand pedal actuation mechanism.

DISCLOSURE OF THE INVENTION

The present invention relates to a hand operated cycle apparatus including a cycle frame having a pair of spaced apart rear wheels rotatably attached along the horizontal axis to the rear of the cycle frame. A yoke is pivotally attached to the front of the cycle frame and a front wheel is rotatably attached to the yoke. A drive mechanism is provided for rotating the front wheel and pedals are attached to an upper portion of the yoke and to the drive apparatus for selectively turning the drive apparatus by hand. A seat is attached to a rear portion of the cycle frame. Brakes are operably attached to the cycle frame for selectively holding both of the rear wheels form rotating with respect to the frame. A footrest is provided for supporting the feet of the cycle user. A wheelchair hitch is connected to the rear of the cycle frame and has an elongated rod extending transverse to the direction of forward movement of the cycle frame and has a pair of spaced locking members thereon so that a wheelchair having foot supports on the front thereof can be easily towed from place to place without the fear of it coming loose, while at the same time being easily attached to or detached from the hitch.

An object of the present invention is to provide an improved hand operated cycle for use by wheelchair-bound persons.

Another object of the present invention is to provide a hand propelled cycle having a hitch on the rear thereof for permitting a wheelchair to be easily towed from place to place and easily attached or detached therefrom.

A further object of the present invention is to provide a hand powered cycle of the aforementioned type which has double brakes on the rear wheels thereof for ensuring that the cycle does not move while the user transfers from the wheelchair to the cycle or from the cycle to the wheelchair and also during the time that the wheelchair is being attached or detached from the hitch mechanism thereof.

A further object of the present invention is to provide adjustable footrests to a hand powered cycle of the aforementioned type.

A still further object of the present invention is to provide a luggage rack under the seat of a hand powered cycle of the aforementioned type.

Other objects, advantages, and novel features of the present invention will become apparent form the following detailed description of the invention when considered in conjunction with the accompanying drawings.

BEST MODE FOR CARRYING OUT THE INVENTION

Figure 1:
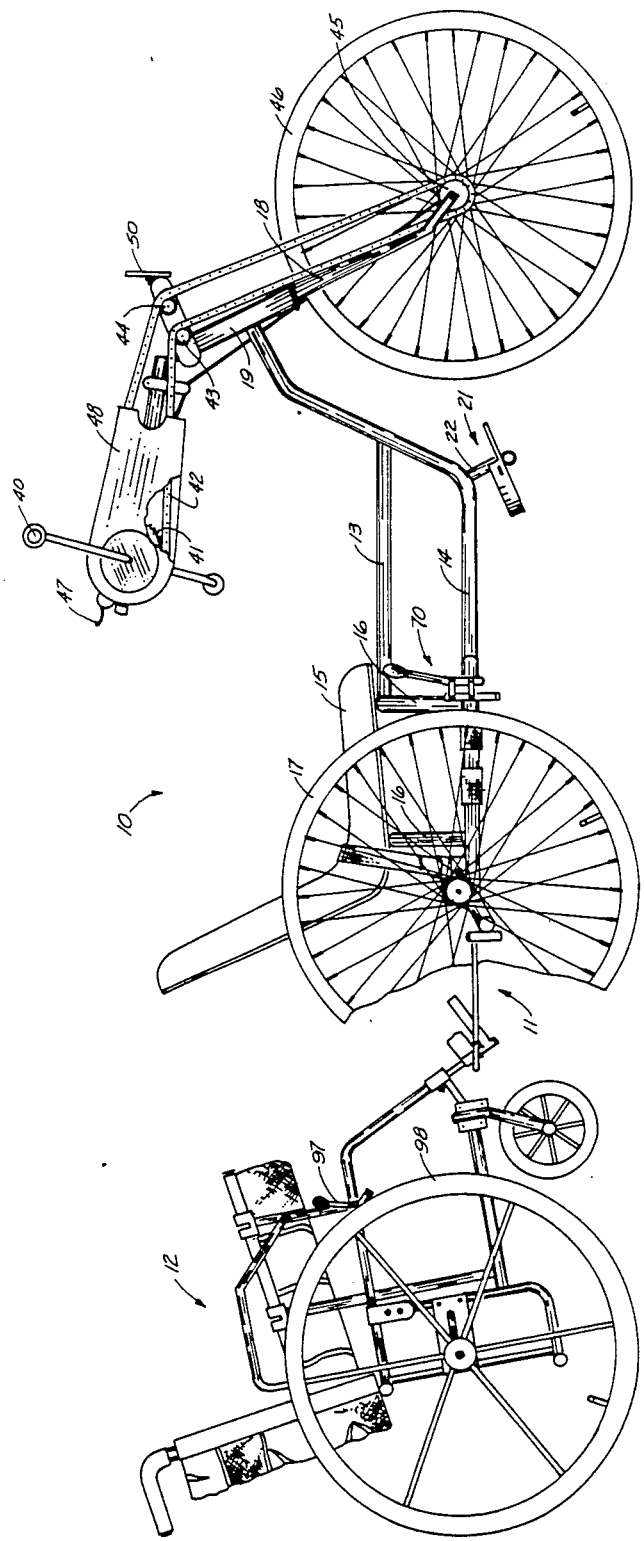
FIG. 1 is a side elevational view of a preferred embodiment constructed in accordance with the present invention with a portion of the rear wheel of the cycle removed to show the hitch mechanism.
Figure 2:
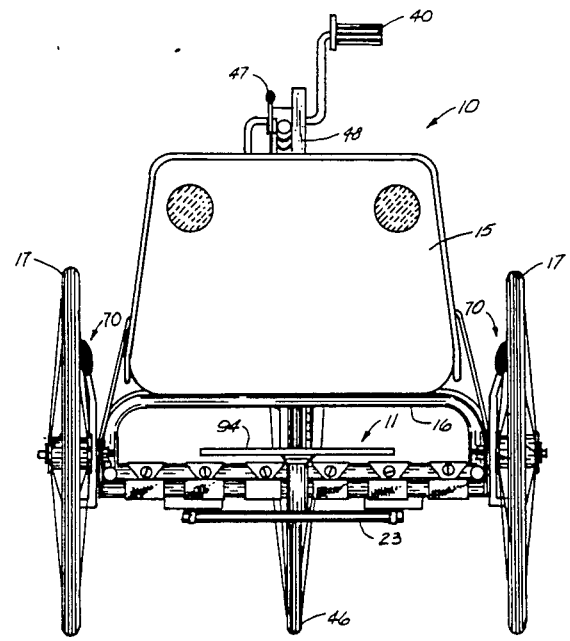
FIG. 2 is a rear view of the cycle of FIG. 1 with the wheelchair removed from the hitch mechanism.
Figure 3:
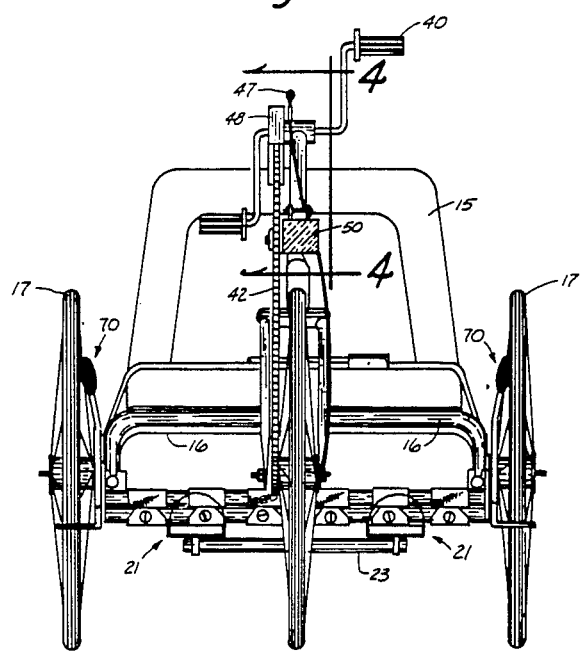
FIG. 3 is a front view of the cycle shown in FIG. 1.

Referring now to the drawings, wherein like reference numerals designate identical or corresponding parts throughout the several views, FIG. 1 shows a cycle (10) constructed in accordance with the present invention and having a hitch (11) attached to the rear thereof for towing a wheelchair (12) from place to place while using the cycle (10). The cycle (10) has a frame which includes members (13 and 14). A seat (15) is attached by braces (16) to the frame (13 and 14). Rear wheels (17) are rotatably attached to the frame (14) and a front yoke (18) is pivotally attached to the frame (14) by a tube (19) rigidly attached to the frame member (14). A foot pedal assembly (21) is attached to the brace (14) by a member (22) which is welded to the frame member (14) and to a bar (23). Plates (24) having openings (25) therein for causing the footrest to be lighter; they have a rear flange (26) attached thereto for preventing the heel from slipping out from the footrest and nylon or leather straps (27) having buckles (28) thereon securely hold the feet in place.

Figure 6:
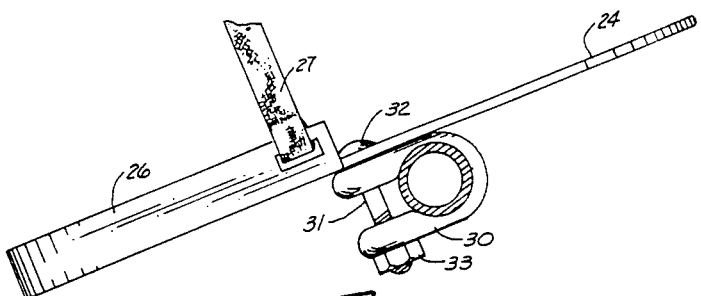
FIG. 6 is a view taken along line 6—6 of FIG. 5 of the foot pedal and the adjustable bracket connecting it to the cycle frame.
Figure 5:
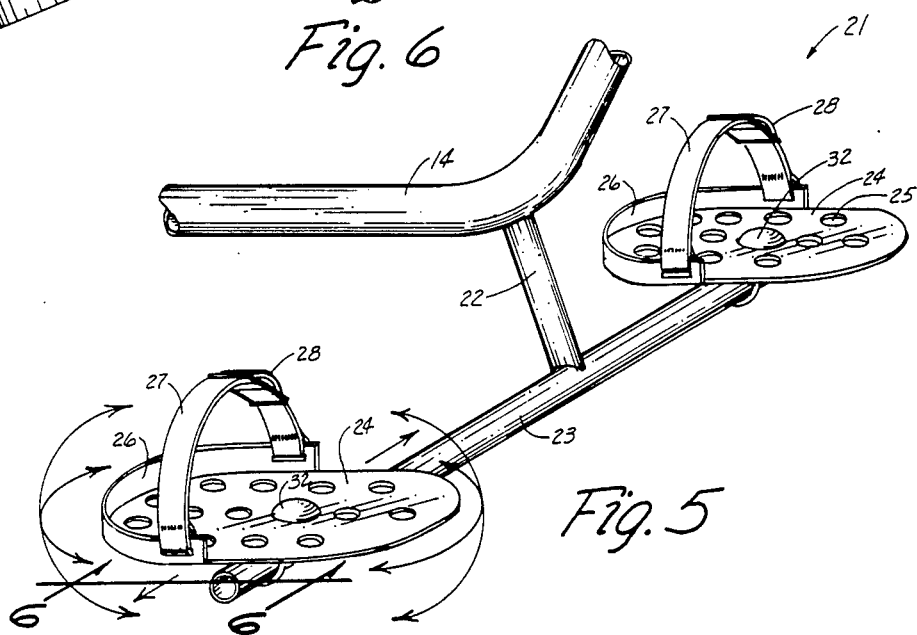
FIG. 5 is an enlarged perspective view of the adjustable footrest of the cycle of FIG. 1.

Referring to FIG. 6 it is noted that a bracket (30) having a bolt (31) extending therethrough and having a carriage head (32) thereon has a nut (33) threadably engaging the bottom thereof for allowing the footrest plate (24) to be tilted around the axis of the bar (23) or adjusted inwardly or outwardly on the bar (23) merely by loosening the nut (33) and making such adjustments and then tightening the nut back onto the bolt (31) after such adjustments have been made.

Referring again to FIG. 1, it is noted that a hand operated pedals or bell crank (40) is rigidly attached to a sprocket (41) which will in turn turn and move and chain (42). This chain (42) extends over idler pulleys (43 and 44), down to a sprocket (45) rigidly attached to the front wheel (46) of the cycle (10). Consequently, when the crank (40) is turned, the chain (42) will turn the sprocket (45), which will turn the wheel (46). Furthermore, the vehicle can be steered because the yoke (18) and the chain (42) and everything shown in FIG. 1 above the tube (19) can be pivoted from side-to-side, just as in the prior art patents discussed above so that the user can steer the cycle by turning the front wheel (46). This can be done at the same time that the bell crank or pedal (40) is used to cause the cycle to move ahead. A gear changing handle (47) is mounted adjacent to a chain guard (48) and has a cable (49) extending down towards the sprocket (45) for changing the gears as in an ordinary bicycle mechanism. The mechanism also has a coaster brake, not shown.

Figure 4:
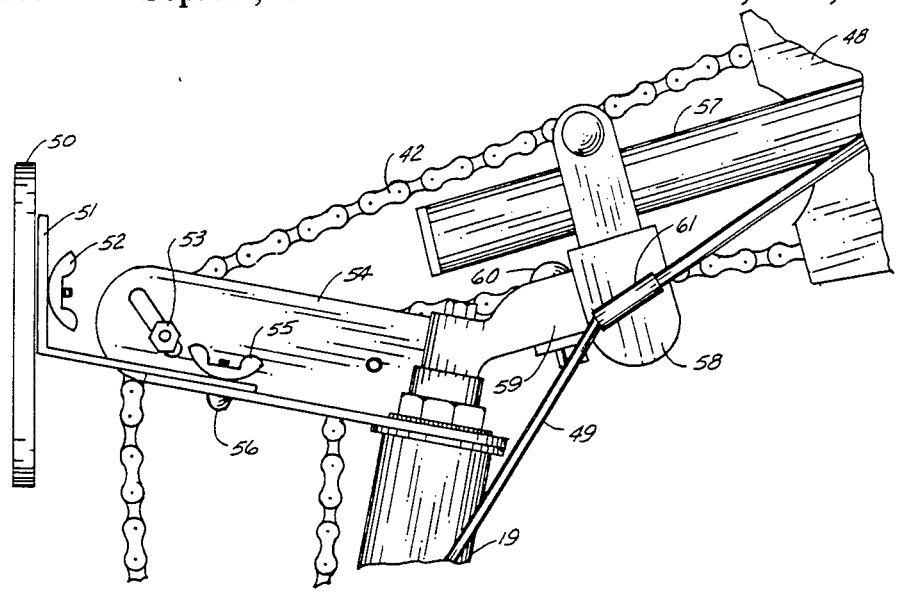
FIG. 4 is an enlarged partial enlarged cross sectional view taken along line 4—4 of FIG. 3.

Referring to FIG. 4 it is noted that the chain (42) can be tightened by the adjustments including members (53, 57, 58, 59).

Figure 7:
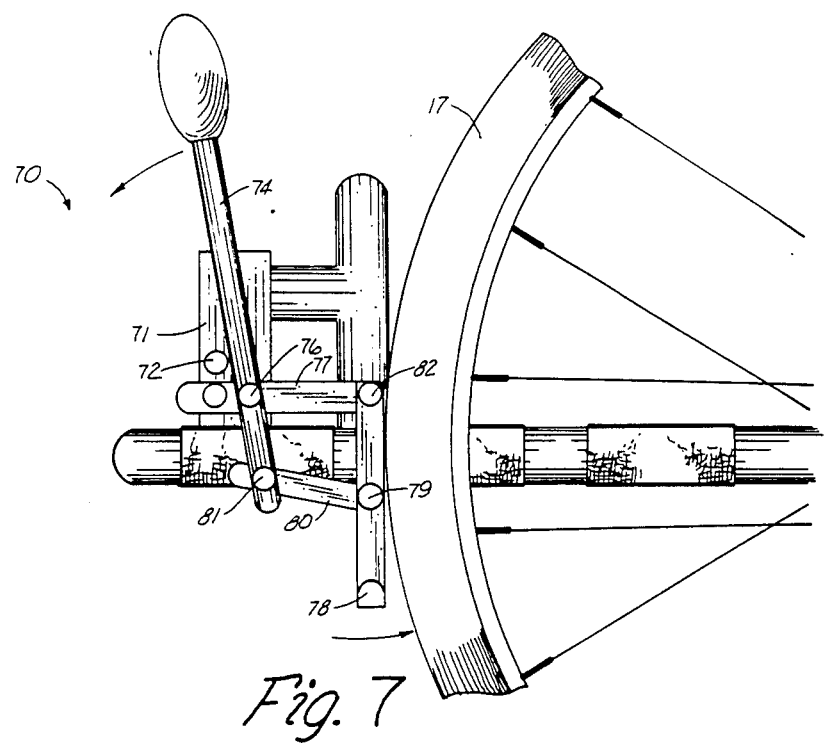
FIG. 7 is an enlarged side elevational view of the brake mechanism shown for each side of the cycle of FIG. 1 and showing it in the unlocked position.
Figure 8:
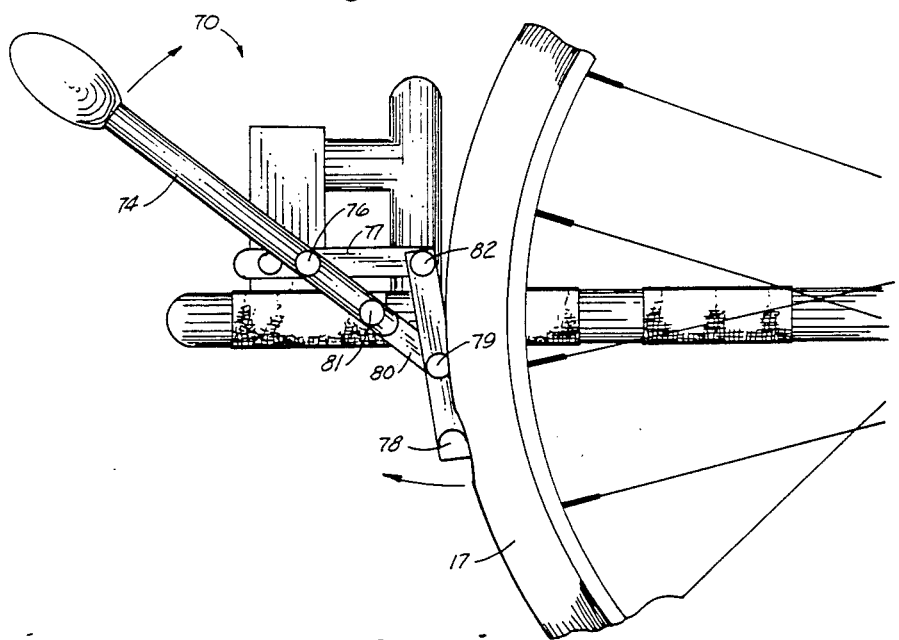
FIG. 8 is a view like FIG. 7, but showing the brake engaging the wheel and preventing it from rotating.
Figure 9:
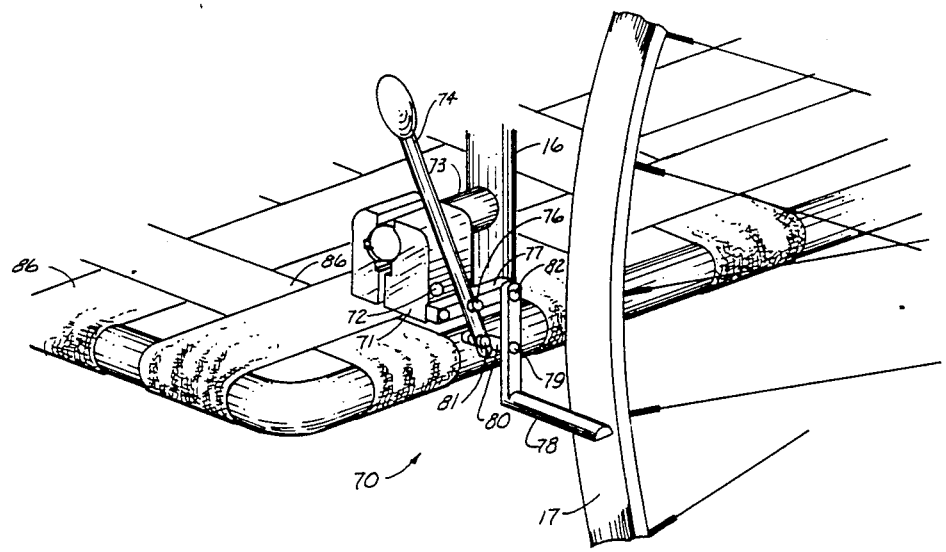
FIG. 9 is a perspective view of the brake mechanism of FIGS. 7 and 8.

Referring now to FIGS. 7, 8 and 9, it is noted that a brake mechanism (70) has a clamp (71) held in place by threaded fasteners (72) to a post (73) on the attached to the frame member (16). This brake is of somewhat a conventional type having a handle (74) pivotally attached at pin (76) to member (77 and 71). An L-shaped member (78) is pivotally attached by pin (79) to a link (80) and the link (80) is pivotally attached by a pin (81) to the bottom of the handle (74). The top of the L-shaped member (78) is pivotally attached by a pin (82) to the member (77). Consequently, when the handle (74) is in the position shown in FIG. 7, the L-shaped member (78) is spaced from the inflated portion of the wheel (17) and consequently the wheel (17) is free to rotate. But when the handle (74) is moved to the position shown in FIG. 8, the L-shaped member (78) is in contact with the wheel (17) and forms a brake to prevent the wheel (17) from rotating. A similar brake (not shown) to the brake (70) is attached to the other side of the frame for braking the other rear wheel (17).

Figure 10:
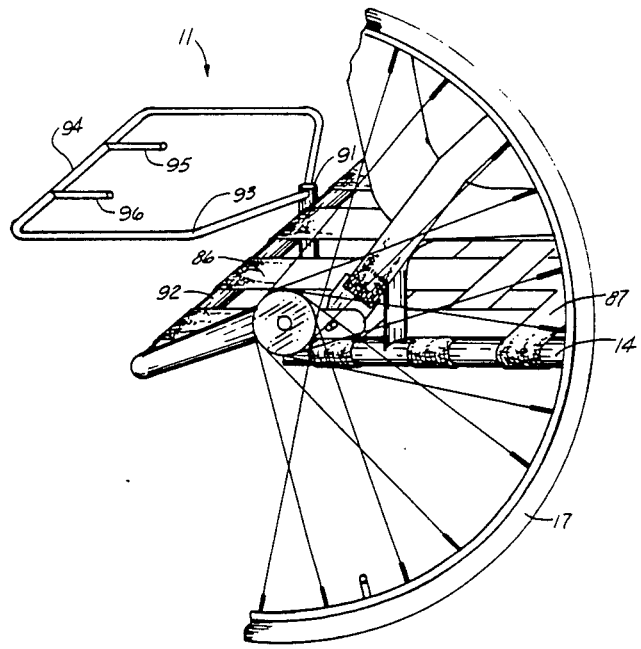
FIG. 10 is a partial perspective view of the cycle with portions broken away to show the hitch mechanism for attaching the wheelchair to the rear of the cycle.
Figure 11:
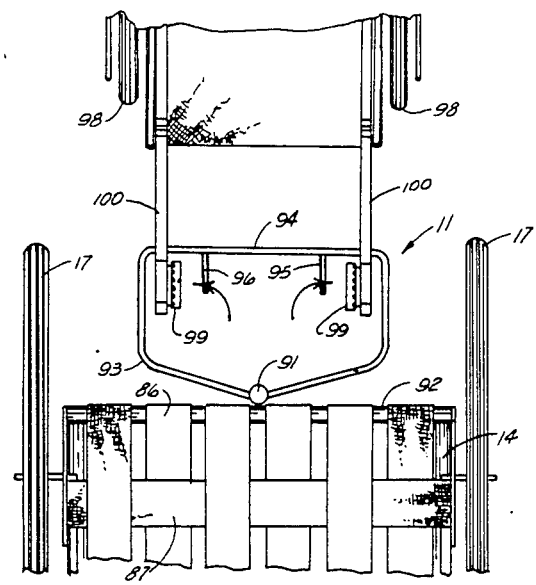
FIG. 11 is a top elevational view of a portion of the cycle and a portion of the wheelchair for showing how the footrest of the wheelchair can be folded up in readiness to hitch the wheelchair to the rear of the cycle.
Figure 12:
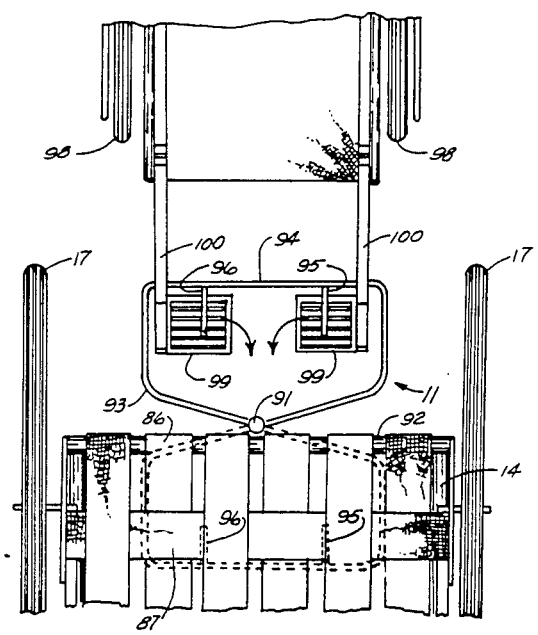
FIG. 12 shows how the footrest are folded down and slid underneath locking members on the hitch so as to prevent the wheelchair from coming loose from the hitch of the cycle while it is in use.

Referring to FIG. 10, it is noted that the frame (14) has webbing (86 and 87) thereon interweaved for forming a luggage rack underneath the seat (15). The webbing (86 and 87) is similar to that used in lawn chairs or the like. Referring to FIGS. 10, 11 and 12, it is noted that a wheelchair hitch (11) is shown connected to the rear of the cycle (10) and is pivotable from a position shown in solid lines in FIG. 12 to a position shown in dashed lines in FIG. 12 by a post (91) pivotally attached to the rear frame member (92). A metal rod (93) is rigidly attached to the member (91) and extends across to a horizontal rod portion (94) having a pair of rods (95 and 96) welded thereto.

In operation, when it is desired to use the apparatus shown in FIG. 1, the user would normally first be in the wheelchair (12). This wheelchair (12) would be wheeled around to a position alongside of the cycle (10) and the user would then transfer from the wheelchair (12) to the seat (15) of the cycle (10), after first having applied the brakes (97) to each wheel (98) of the wheelchair (12). At the same time that is done, the brakes (70) are be in the position shown in FIG. 8 so that neither the wheelchair (12) or the cycle (10) can move while this transfer is occuring. Once the transfer has occurred, then the brakes (97) on the wheelchair (12) are disengaged so that the wheelchair can then be moved by the user back to the position shown in FIG. 11. But before the user moves the wheelchair to that position, footrest (99) attached to rods (100) of the wheelchair are pivoted to the upward position as shown in FIG. 11. Then the wheelchair is pivoted up and over the top of the horizontal rod (94) to a position somewhat forwardly of the position shown in FIG. 11. Then the footrest (99) are pivoted downwardly so that they are in a position below the locking members (95 and 96). Once they are forwardly of the locking pins (95 and 96) and in the down position as shown in FIG. 12, then the wheelchair (12) is pushed back so that the footrest (99) are in the position shown in FIG. 12. When in such a position, the wheelchair can be towed from place to place by use of the cycle (10) without fear that the wheelchair will slip out of the hitch. At that point, the brakes (70) on the cycle can be disengaged or moved to the position shown in FIG. 7 and the user can then turn the bell crank (40) and go to wherever he or she desires to go. When the user of the apparatus shown in FIG. 1 arrives at his or her office, at a grocery store or a shopping mall or the like, then the cycle (10) can be left outside while the user goes inside in the wheelchair (12). This is accomplished by a reverse procedure whereby the brakes (70) on both wheels (17) are moved to the FIG. 8 position and then the wheelchair is removed from the hitch as shown in FIG. 12 by pulling the wheelchair (12) forwardly, flipping the footrest (99) upwardly as shown in FIG. 11 and then lifting the portions of the wheelchair within the hitch (11) out and moving the wheelchair (12) alongside the cycle (10). Then the brakes (97) on the wheelchair will be used to lock the wheels (98) from movement and the user can transfer from the seat (15) of the cycle (10) to the wheelchair (12). Obviously then, after the user has gone on into the office or grocery store or shopping mall or the like, a reverse procedure can be utilized as often as is necesary to go from place to place on the cycle (10) while taking the wheelchair (12) along for use indoors.

It is also important to note that a briefcase or any other cargo can be taken along at the same time by storing it on the webbing (86 and 87) below the seat (15). If it would be desired to not use the hitch (11), it can be pivoted to the position shown in dashed lines in FIG. 7 where it would be out of the way.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practised otherwise than as specifically described.

I claim:

1. A hand operated cycle apparatus comprising:
   a cycle frame;
   a pair of spaced apart rear wheels rotatably attached along a horizontal axis to the rear of the cycle frame;
   a yoke pivotally attached to the front of the cycle frame;
   a front wheel rotatably attached to said yoke;
   drive means for selectively rotating said front wheel;
   pedal means attached to an upper portion of said yoke and to said drive means for selectively turning said drive means by hand;
   a seat operably attached to a rear portion of said cycle frame;
   brake means operably attached to said cycle frame for selectively holding each of the rear wheels form rotating with respect to the frame;
   footrest means for supporting the feet of a cycle user;
   a wheelchair having wheelchair frame and a seat, a pair of rear wheels, a pair of front wheels and footrests connected to said wheelchair frame;
   a wheelchair hitch connected to the rear of said cycle frame, said hitch comprising a somewhat horizontally disposed rod extending transverse to the direction of forward movement of said cycle frame and a pair of spaced apart locking members connected at one end to said rod and extending in the direction of forward movement of said cycle frame whereby the footrests of said wheelchair can be placed below said locking members to prevent the wheelchair from being dislodged from said hitch when said wheelchair is being towed behind said cycle frame.

2. The apparatus of claim 1 wherein:
   said rod of the hitch is part of a continuous loop; and
   means for pivotally attaching said loop to said frame along a vertical axis whereby said hitch can be pivoted between an operative position and a stored position.

3. The apparatus of claim 1 including means connected to the cycle frame for adjusting the position of the footrest means.

4. The apparatus of claim 3 wherein said footrest adjusting means comprises:
   a horizontal bar connected to said frame;
   clamp means for frictionally gripping said bar;
   threaded fastener means connecting the footrest means to the clamp means whereby when the threaded fastener means is loosened, the footrest means can be adjustably pivoted about a horizontal axis and can be adjustably slid along the bar and once the footrest means is in a desired position, the threaded fastener means can be tightened down to frictionally hold the footrest means in place with respect to the clamp means and the bar.

5. The apparatus of claim 4 including luggage rack means attached to said frame below said seat for storing cargo.

* * * * *